(12) United States Patent
Klein et al.

(10) Patent No.: US 12,488,666 B2
(45) Date of Patent: Dec. 2, 2025

(54) SYSTEM FOR MOUNTING ON A SURFACE

(71) Applicant: Axis AB, Lund (SE)

(72) Inventors: Malin Klein, Lund (SE); Ola Björk, Lund (SE); Sebastian Lundblad, Lund (SE)

(73) Assignee: AXIS AB, Lund (SE)

( * ) Notice: Subject to any disclaimer, the term of this patent is extended or adjusted under 35 U.S.C. 154(b) by 130 days.

(21) Appl. No.: 18/634,116

(22) Filed: Apr. 12, 2024

(65) Prior Publication Data

US 2024/0395122 A1 Nov. 28, 2024

(30) Foreign Application Priority Data

May 26, 2023 (EP) .................................. 23175787

(51) Int. Cl.
 *G08B 13/196* (2006.01)
(52) U.S. Cl.
 CPC .............................. *G08B 13/19632* (2013.01)
(58) Field of Classification Search
 None
 See application file for complete search history.

(56) References Cited

U.S. PATENT DOCUMENTS

| | | | |
|---|---|---|---|
| 6,234,691 B1 | 5/2001 | Jones et al. | |
| 7,217,045 B2 | 5/2007 | Jones | |
| 10,623,615 B2* | 4/2020 | Vestergren | F16M 13/027 |
| 11,047,416 B2* | 6/2021 | Heinrichs | F16B 5/06 |
| 2009/0060681 A1 | 3/2009 | Nakanishi | |
| 2012/0073094 A1 | 3/2012 | Bishop | |
| 2013/0272783 A1 | 10/2013 | Ramsauer | |
| 2017/0030389 A1 | 2/2017 | Abboud | |
| 2017/0297506 A1 | 10/2017 | Santillan Gutierrez et al. | |
| 2018/0058484 A1* | 3/2018 | Marshman | F16B 5/065 |

(Continued)

FOREIGN PATENT DOCUMENTS

| | | |
|---|---|---|
| EP | 3388689 A1 | 10/2018 |
| EP | 3550158 B1 | 12/2020 |
| JP | 2017-141940 A | 8/2017 |

OTHER PUBLICATIONS

Extended European Search Report mailed on Oct. 30, 2023, received for EP Application 23175787.3, 10 pages.

(Continued)

*Primary Examiner* — Rodney E Fuller
(74) *Attorney, Agent, or Firm* — XSENSUS LLP

(57) ABSTRACT

A system includes a mounting bracket configured for attachment to the surface, a plastic clamp having a base part and a connection part. The mounting bracket is provided with an opening into which the base part of the plastic clamp is insertable with a snap fit and the connection part of the plastic clamp is configured for snap fit engagement with an object attachable to the mounting bracket. The base part comprises two legs, each comprising a guide surface and an L-shaped corner section, the guide surface being configured to engage the mounting bracket in response to insertion of the base part into the opening and the L-shaped corner section being configured to face an edge portion of the opening when the base part has been received by the opening. The legs deflect in response to guide surfaces engaging the mounting bracket so the base part is insertable into opening.

11 Claims, 6 Drawing Sheets

(56) References Cited

U.S. PATENT DOCUMENTS

2018/0291942 A1   10/2018  Shinoda
2019/0072120 A1*  3/2019  Santillan Gutierrez ................... F16B 21/086
2020/0063779 A1   2/2020  Mutz

OTHER PUBLICATIONS

Magnusson et al., Novelty Search, UppdragsHuset, 20 years of finding, Mar. 29, 2023, pp. 1-2.

* cited by examiner

SYSTEM FOR MOUNTING ON A SURFACE

CROSS-REFERENCE TO RELATED APPLICATION

The present application is based upon and claims the benefit of priority from EP patent application Ser. No. 23175787.3, filed May 26, 2023, the entire disclosures of which are hereby incorporated by reference.

FIELD OF THE INVENTION

The present invention relates to a system intended to be mounted on a surface, which system comprises a mounting bracket configured for attachment to the surface.

BACKGROUND ART

A system intended to be mounted on a surface often comprises a mounting bracket which is configured for attachment to the surface. Additional objects of the system may subsequently be releasably attached to the mounting bracket, such as by means of snap fit mounting.

The system may for instance be a surveillance camera system in which objects in the form of a camera unit and a dome window are attached to and supported by the mounting bracket.

The mounting bracket is often made of a strong and durable material, such as metal, which itself may not be suitable for snap fit mounting, and the mounting bracket may therefore be provided with plastic clamps enabling such snap fit mounting of one or more objects to the mounting bracket.

It has proven difficult to provide such a system which is easy to assemble while also ensuring reliable releasable attachment of objects to the mounting bracket.

SUMMARY OF THE INVENTION

In view of that stated above, it is an object of the present invention to provide an improved plastic clamp for attachment of an object to a mounting bracket.

It is also an object to provide such a plastic clamp which is easy to mount to the mounting bracket and which enables reliable releasable attachment of an object to the mounting bracket.

It is a further object to provide an improved system for mounting on a surface and comprising a mounting bracket and a plastic clamp.

To achieve at least one of the above objects and also other objects that will be evident from the following description, a system having the features defined in claim 1 is provided according to the present invention. Preferred embodiments will be evident from the dependent claims.

More specifically, according to the present invention, a system intended to be mounted on a surface is provided, the system comprising a mounting bracket configured for attachment to the surface, a plastic clamp having a base part and a connection part, wherein the mounting bracket is provided with an opening into which the base part of the plastic clamp is insertable with a snap fit for mounting of the plastic clamp to the mounting bracket, wherein the connection part of the plastic clamp is configured for snap fit engagement with an object attachable to the mounting bracket, wherein the base part of the plastic clamp comprises two legs, wherein each leg comprises a guide surface and an L-shaped corner section, the guide surface being configured to engage the mounting bracket in response to insertion of the base part of the plastic clamp into the opening and the L-shaped corner section being configured to face an edge portion of the opening when the base part of the plastic clamp has been received by the opening with a snap fit, wherein the legs are configured to be deflected in response to the guide surfaces engaging the mounting bracket such that the base part is insertable into the opening, wherein the L-shaped corner section of each leg is configured to, in a mounted state of the plastic clamp, engage the respective edge portion of the opening in response to extraction of the base part out of the opening such that the leg is pivoted about an axis defined by the L-shaped corner section under elastic deformation of the leg, and wherein the legs, when pivoted about the respective axis under elastic deformation, are configured to be brought to a state in which they abut each other such that further pivoting is restricted and thereby counteracting further extraction of the base part.

Hereby an improved system intended to be mounted on a surface is provided. The system comprises a mounting bracket and a plastic clamp mountable to the mounting bracket and configured for snap fit attachment of an object to the mounting bracket. Thus, the mounting bracket may be made of a strong and durable material, such as metal, whereas the plastic clamp may be made of a plastic material enabling reliable snap fit attachment of the object to the mounting bracket.

The plastic clamp comprises a base part comprising two legs, each being provided with a guide surface configured to engage the mounting bracket such that the legs are deflected when inserting the base part of the plastic clamp into the opening provided in the mounting bracket, whereby the base part is received by the opening with a snap fit. Hereby easy assembly of the system is ensured.

Each leg of the plastic clamp may further comprise an L-shaped corner section which is configured to face an edge portion of the opening when the base part of the plastic clamp has been received by the opening with a snap fit. The L-shaped corner sections are configured to, in the mounted state of the plastic clamp, engage the edge portions of the opening in response to extraction of the base part out of the opening such that the leg is pivoted about an axis defined by the L-shaped corner section under elastic deformation of the leg. The legs are, when pivoted about the respective axis under elastic deformation, configured to be brought to a state in which they abut each other such that further pivoting is restricted and thereby counteracting further extraction of the base part. Thus, by controlling the elastic deformation of the legs such that they are brought to abut each other it is ensured that the plastic clamp cannot simply be drawn out of the opening of the mounting bracket. Hereby it is ensured that the system prevents unintentional detachment of the plastic clamp from the mounting bracket.

According to an embodiment, each leg of the base part may comprise an elongated body having: a first portion extending from the connection part in a longitudinal direction of the plastic clamp; a second portion forming said guide surface, adjoining the first portion and extending at an acute angle to the first portion for forming a bend at a front end of the leg; and a third portion forming said L-shaped section and adjoining the second portion. Such a configuration may allow for efficient utilization of material when producing the plastic clamp.

According to another embodiment, the elongated body of each leg may have a reinforced transition section between the first portion and the second portion. Hereby, the elastic deformation of the legs of the base part may be further controlled to ensure that the legs reliably abut each other in response to extraction of the base part out of the opening.

According to a further embodiment, the base part may have a base part width W1 in an unaffected state, wherein the opening has an opening width W2 and wherein the base part width W1 in the unaffected state is greater than the opening width W2. Further, the base part may have a base part width W3 in an affected state in which the legs are deflected towards each other in response to insertion of the base part of the plastic clamp into the opening, wherein the opening has an opening width W2 and wherein the base part width W3 in the affected state corresponds to the opening width W2. Hereby snap fit mounting of the plastic clamp to the mounting bracket may be enabled.

According to a further embodiment, the system may comprise an additional plastic clamp, wherein the mounting bracket is provided with an additional opening into which the base part of the additional plastic clamp is insertable with a snap fit for mounting of the additional plastic clamp to the mounting bracket. The provision of two plastic clamps may facilitate snap fit attachment of an object to the mounting bracket. The plastic clamp and the additional plastic clamp may be oppositely arranged on the mounting bracket when mounted thereto.

According to a further embodiment, the opening of the mounting bracket may be provided in a peripheral portion thereof. Hereby easy access to the plastic clamp may be provided for attachment and detachment of an object to the mounting bracket.

According to a further embodiment, the system may comprise an object attachable to the mounting bracket by snap fit engagement with the plastic clamp in its mounted state. The object may be a camera unit.

According to a further embodiment, the mounting bracket may be made of a metal material.

According to a further embodiment, the connection part of the plastic clamp may be provided with a tab protruding from the connection part in a longitudinal direction of the plastic clamp. The tab may be used for detachment of an object attached to the mounting bracket by snap fit engagement with the plastic clamp.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
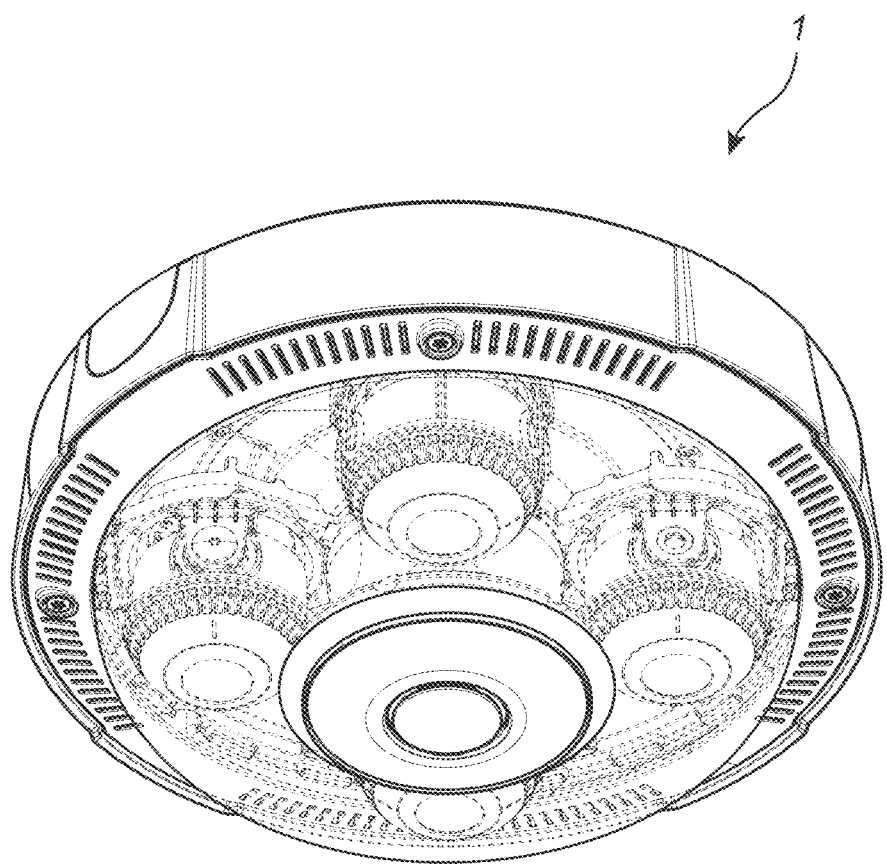
FIG. 1 is a perspective view of a system intended to be mounted on a surface.

In FIG. 1, whereto reference is made, a system 1 intended to be mounted on a surface is illustrated. In the shown embodiment, the system 1 is a camera device which is intended to be mounted on a surface such as a ceiling. The system may be arranged for outdoor or indoor application.

Figure 2:
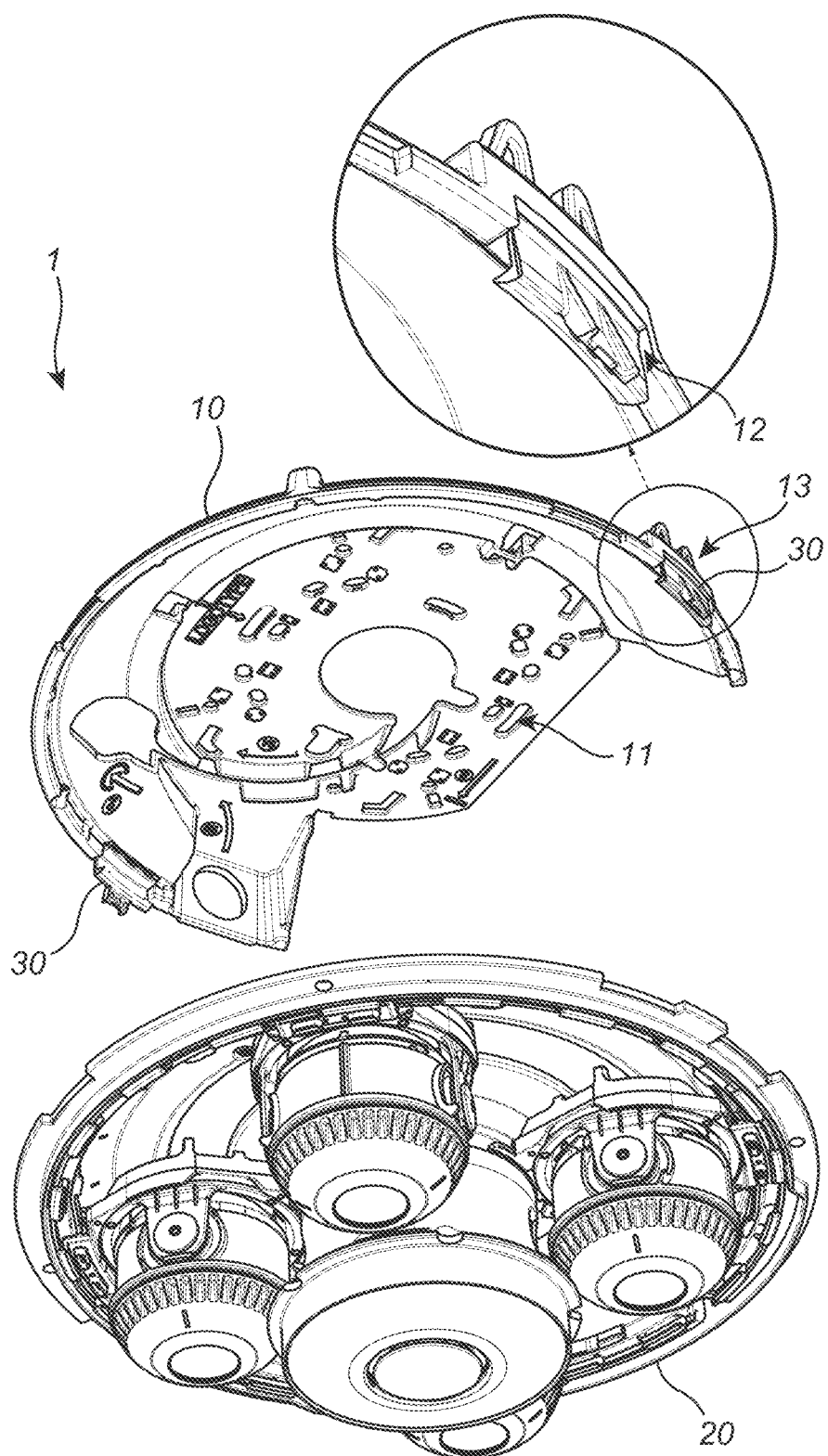
FIG. 2 is a perspective view in exploded form illustrating a mounting bracket and an object in the form of a camera unit of a system intended to be mounted on a surface.

In FIG. 2, some components of the system 1 shown in FIG. 1 are illustrated in an exploded view. The components comprise a mounting bracket 10, a plastic clamp 30, and an object 20 in the form of a camera unit.

The mounting bracket 10 is configured for attachment to the surface and may for instance be provided with screw holes 11 enabling attachment of the mounting bracket 10 to the surface by means of screws.

The mounting bracket 10 may be made of metal or plastic material. Metal material may be a preferred material for the mounting bracket in a system intended for outdoor application.

The mounting bracket 10 is further provided with an opening 12 into which the plastic clamp 30 is insertable for mounting the plastic clamp 30 to the mounting bracket 10. The opening 12 may be provided in a peripheral portion 13 of the mounting bracket 10.

The object 20 is attachable to the mounting bracket 10 by snap fit engagement with the plastic clamp 30 in its mounted state.

In the shown embodiment, the mounting bracket 10 is provided with an additional opening 12 configured for reception of an additional plastic clamp 30. The additional opening 12 may be provided in the peripheral portion 13 of the mounting bracket.

The plastic clamp 30 and the additional plastic clamp 30 are oppositely arranged on the mounting bracket 10 when mounted thereto.

In the shown embodiment, the object 20 in the form of a camera unit is attachable to the mounting bracket 10 also by snap fit engagement with the additional plastic clamp 30.

It is understood that the system 1 may comprise further additional plastic clamps mounted to the mounting bracket 10 and configured for snap fit engagement with the object 20.

It is also understood that only one plastic clamp may be used for attachment of the object 20 to the mounting bracket 10. For instance, a part of the object 10 may be secured to the mounting bracket at a peripheral portion thereof opposite to the plastic clamp, whereafter the object may be pushed upwards such that the plastic clamp engages the object with a snap fit for attachment thereof to the mounting bracket.

The system 1 may comprise additional objects which may be attached to the mounting bracket 10 by means of snap fit engagement with one or more plastic clamps mounted to the mounting bracket. Such an additional object may for instance be a dome window.

Figure 3:
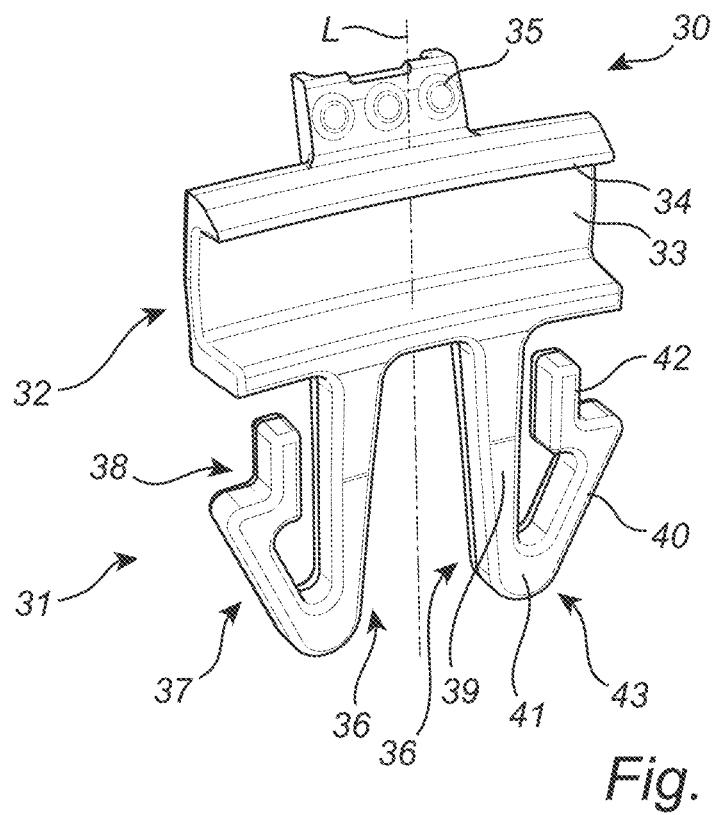
FIG. 3 is a perspective view of a plastic clamp for attachment of an object to a mounting bracket.

In FIG. 3, to which reference now is made, a plastic clamp 30 for a system as disclosed above is shown.

The plastic clamp 30 comprises a base part 31 and a connection part 32.

The base part 31 is insertable into the opening 12 of the mounting bracket 10 for mounting of the plastic clamp 30 to the mounting bracket 10.

The connection part 32 is configured for snap fit engagement with the object 20 attachable to the mounting bracket 10. More specifically, the connection part 32 comprises a web 33 extending in a longitudinal direction L of the plastic clamp 30. The web 33 is provided with an upper protruding ridge 34. When the object 20 is attached to the mounting bracket 10, the upper protruding ridge 34 is configured to engage the object such that the connection part 32 is deflected for allowing the object 20 to be mounted with a snap fit.

The connection part 32 further comprises a tab 35 protruding from the connection part 32 in the longitudinal direction L of the plastic clamp 30. In the shown embodiment, the tab 35 is arranged on top of the web 33. The tab 35 may be used for detachment of the object 20 from the mounting bracket 10. More specifically, the tab 35 may be manipulated for deflecting the connection part 32 of the plastic clamp 30 such that detachment of the object 20 is enabled.

The base part 31 comprises two legs 36, each comprising a guide surface 37 and an L-shaped corner section 38. More specifically, each leg 36 comprises an elongated body having: a first portion 39 extending from the connection part 32 in the longitudinal direction L of the plastic clamp 30; a second portion 40 forming said guide surface 37, adjoining the first portion 39 and extending at an acute angle to the first portion 39 for forming a bend 41 at a front end of the leg 36; and a third portion 42 forming said L-shaped section 38 and adjoining the second portion 40.

The elongated body of each leg 36 may have a reinforced transition section 43 between the first portion 39 and the second portion 40, i.e., in the bend 41 at the front end of the leg 36.

Each guide surface 37 provided in the second portion 40 of each leg 36 is configured to engage the mounting bracket 10 in response to insertion of the base part 31 of the plastic clamp 30 into the opening 12 provided in the mounting bracket 10 such that the legs 36 are deflected for allowing snap fit mounting of the plastic clamp 30 to the mounting bracket 10.

Each L-shaped corner section 38 formed by the third portion 42 of each leg 36 is configured to face a respective edge portion of the opening 12 of the mounting bracket 10 when the plastic clamp 30 is mounted to the mounting bracket 10.

Figure 4:
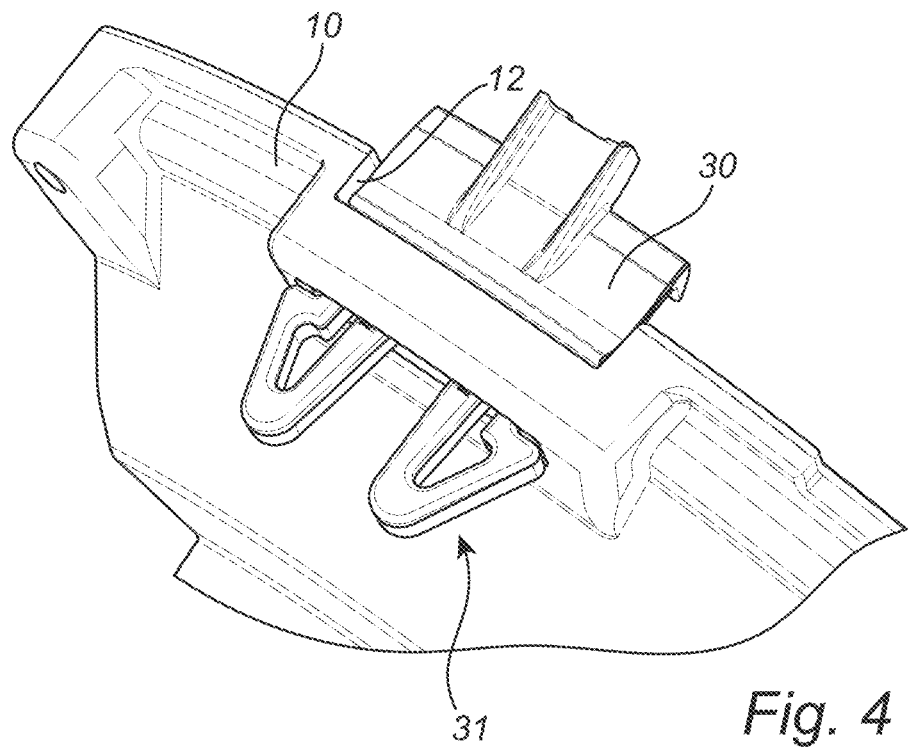
FIG. 4 is a perspective view of a plastic clamp mounted to a mounting bracket.

In FIG. 4, to which reference now is made, a plastic clamp 30 mounted to a mounting bracket 10 with a snap fit is illustrated. More specifically, the plastic clamp 30 has been mounted by insertion of the base part 31 into the opening 12 of the mounting bracket 10, which is disclosed more in detail in FIG. 5*a, b*.

Figure 5A:
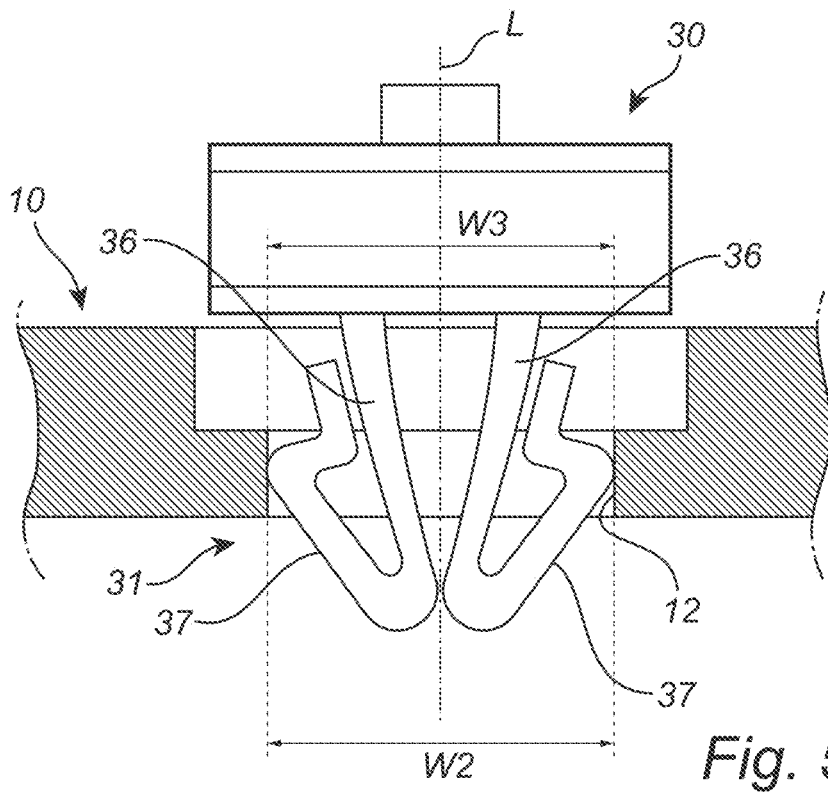
FIG. 5a, b are schematic cross sectional views illustrating snap fit mounting of a plastic clamp to a mounting bracket.

In FIG. 5*a*, the base part 31 of the plastic clamp 30 has been partly inserted into the opening 12, wherein the guide surface 37 of each leg 36 has engaged the mounting bracket 10 such that the legs 36 are deflected towards each other. As evident from the figure, the base part 31 has a base part width W3 in an affected state in which the legs 36 are deflected towards each other, which base part width W3 corresponds to an opening width W2 of the opening 12 of the mounting bracket 10.

Figure 5B:
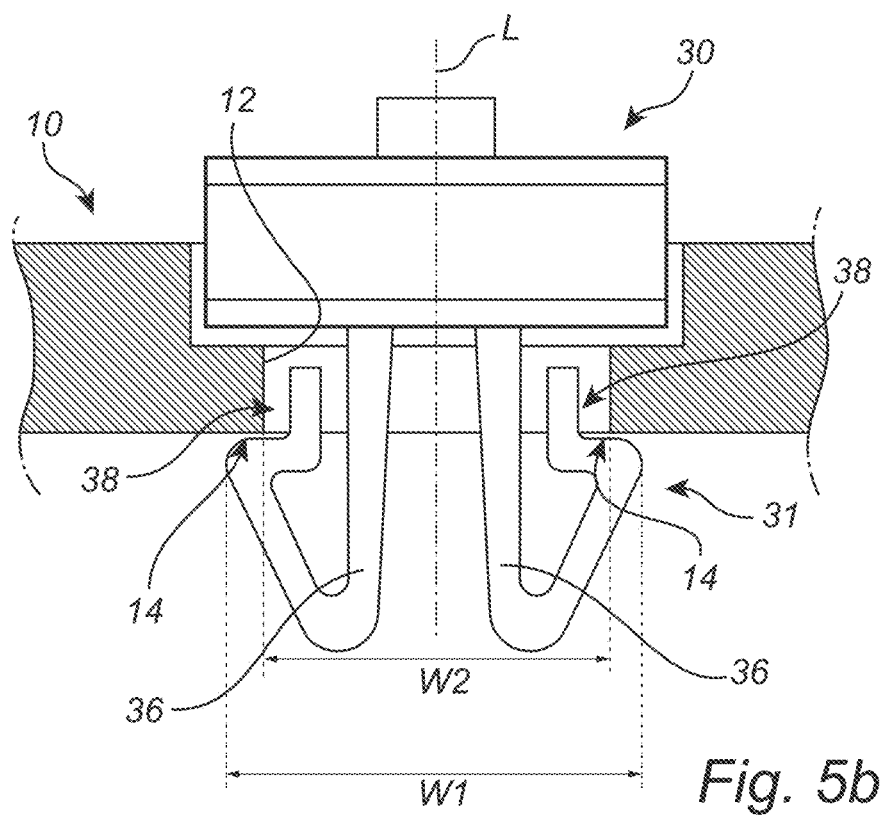

In FIG. 5*b*, the base part 31 has been fully inserted into the opening 12 of the mounting bracket 10, and the legs 36 have been allowed to assume original position, i.e., to deflect back, such that the plastic clamp 30 is snap fit mounted to the mounting bracket 10.

In the mounted state of the plastic clamp 30, the base part 31 has a base part width W1 corresponding to an unaffected state, which unaffected base part width W1 is greater than the opening width W2 of the opening 12 of the mounting bracket 10.

In the mounted state of the plastic clamp 30, the L-shaped corner section 38 of each leg 36 of the base part 31 is configured to face a respective edge portion 14 of the opening 12 of the mounting bracket 10.

Figure 6:
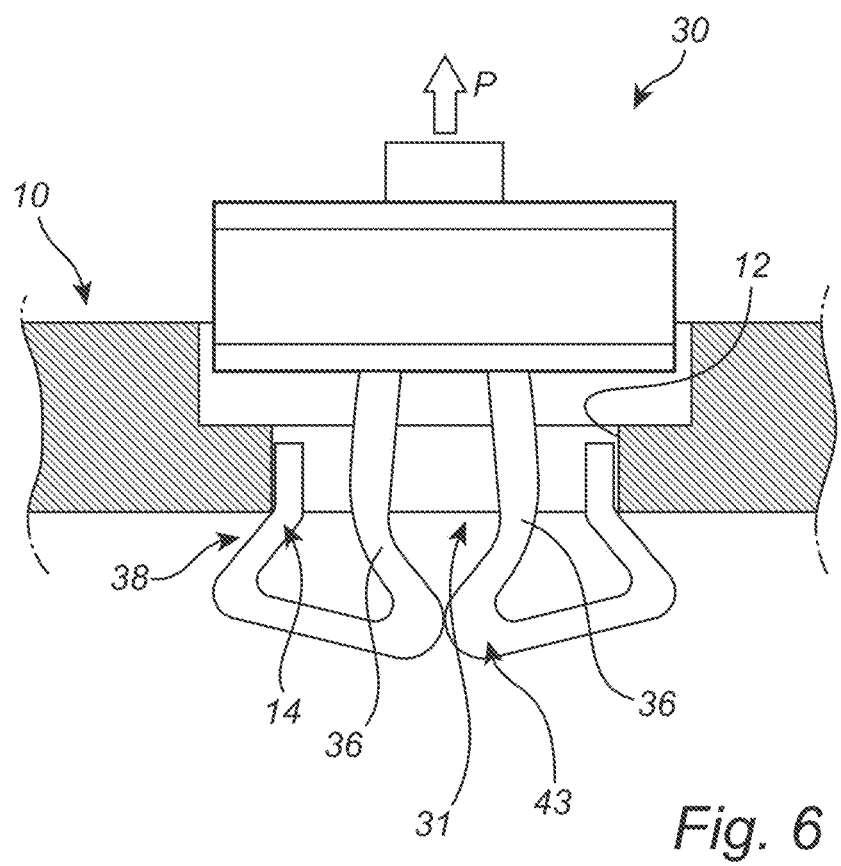
FIG. 6 is a schematic cross sectional view illustrating extraction of the plastic clamp shown in FIG. 4 out of the mounting bracket.

The plastic clamp 30 is configured to prevent unintentional detachment from the mounting bracket 10. More specifically, the plastic clamp 30 is configured to prevent complete extraction of the base part 31 out of the opening 12 of the mounting bracket 10 in response to application of a pulling force to the plastic clamp 30, which now will be discussed with reference to FIG. 6.

As mentioned above, each leg 36 comprises an L-shaped corner section 38 which in the mounted state of the plastic clamp 30 faces a respective edge portion 14 of the opening 12. When a pulling force P is applied to the plastic clamp 30 acting to try to extract the plastic clamp 30 out of the opening 12, the L-shaped corner sections 38 will engage the respective edge portions 14 causing the legs 36 to pivot about a respective axis defined by each L-shaped corner section 38 under elastic deformation of the legs 36. The legs 36 are, when pivoted about the respective axis under elastic deformation, configured to be brought to a state in which they abut each other such that further pivoting is restricted and thereby counteracting further extraction of the base part 31. The reinforced transition 43 section of each leg 36 facilitates controlled deformation of the legs 36 such that the state in which the legs 36 abut each other is achieved in a desired manner.

The legs 36 of the base part 31 are thus configured to undergo controlled elastic deformation in response to application of a force P acting to extract the plastic clamp 30 out of the opening 12 of the mounting bracket 10 such that the legs 36 are brought to a state in which they abut each other, thereby counteracting further extraction. Hereby, unintentional detachment of the plastic clamp 30 from the mounting bracket 10 may be prevented. The application of a force P acting to extract the plastic clamp 30 may be applied directly to the plastic clamp 30, or indirectly, for instance by applying a pulling force to the object attached to the mounting bracket.

Figure 7A:
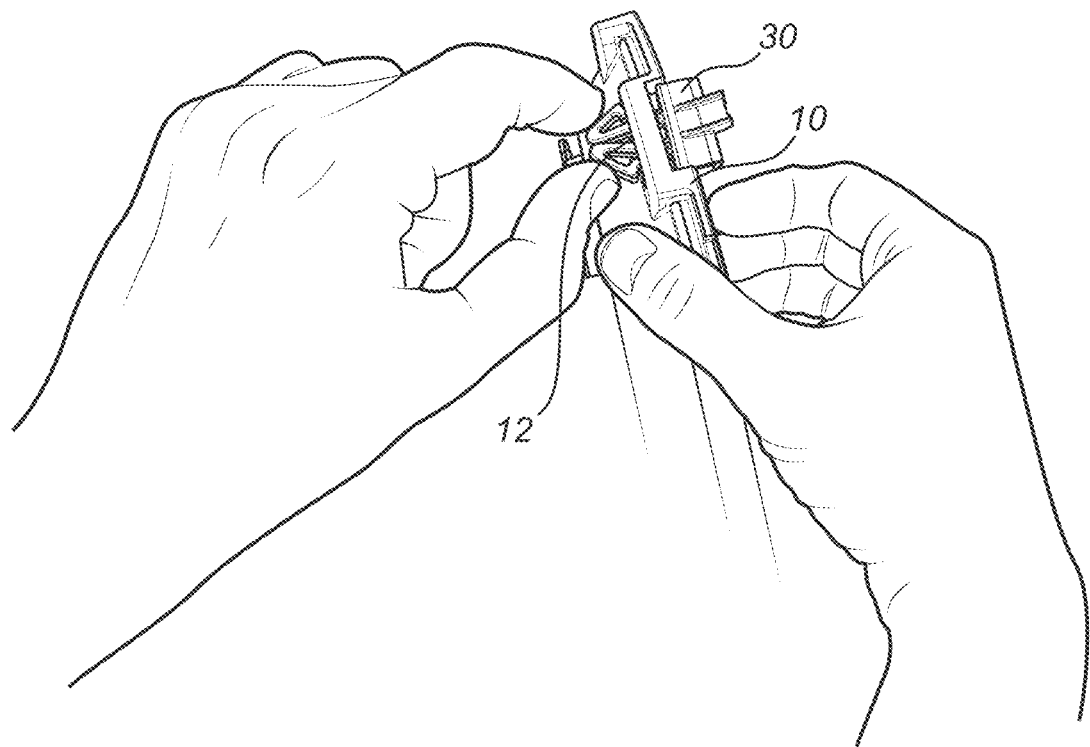
FIG. 7a, b are perspective views illustrating detachment of the plastic clamp shown in FIG. 4 from the mounting bracket.
Figure 7B:
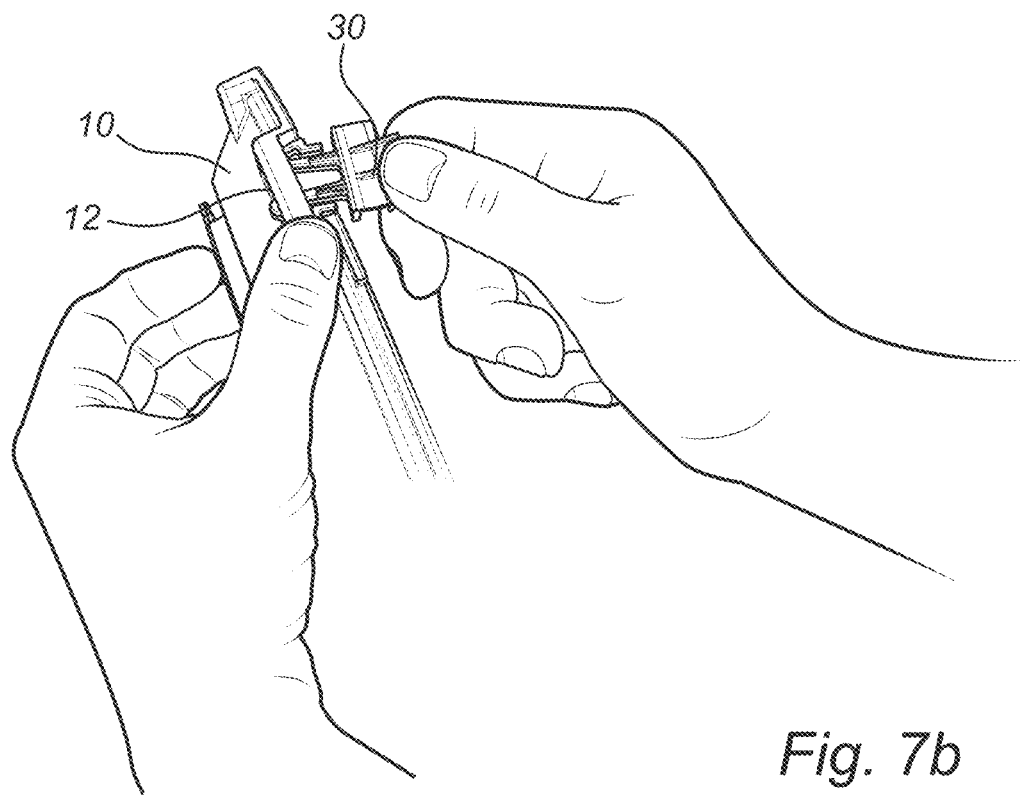

It is understood that the plastic clamp 30 may be intentionally detached from the mounting bracket 10 by pressing the legs 36 towards each other and subsequently pushing the base part 31 out of the opening 12 as illustrated in FIG. 7*a, b*.

It will be appreciated that the present invention is not limited to the embodiments shown. Several modifications and variations are thus conceivable within the scope of the invention which thus is exclusively defined by the appended claims.

The invention claimed is:

1. A system intended to be mounted on a surface, the system comprising
   a mounting bracket configured for attachment to the surface,
   a plastic clamp having a base part and a connection part,
   wherein the mounting bracket is provided with an opening into which the base part of the plastic clamp is insertable with a snap fit for mounting of the plastic clamp to the mounting bracket,
   wherein the connection part of the plastic clamp is configured for snap fit engagement with an object attachable to the mounting bracket,
   wherein the base part of the plastic clamp comprises two legs,
   wherein each leg comprises a guide surface and an L-shaped corner section, the guide surface being configured to engage the mounting bracket in response to insertion of the base part of the plastic clamp into the opening and the L-shaped corner section being configured to face an edge portion of the opening when the base part of the plastic clamp has been received by the opening with a snap fit,
   wherein each leg of the base part comprises an elongated body having: a first portion extending from the connection part in a longitudinal direction L of the plastic clamp; a second portion forming said guide surface, adjoining the first portion and extending at an acute angle to the first portion for forming a bend at a front end of the leg; and a third portion forming said L-shaped corner section and adjoining the second portion,
   wherein the legs are configured to be deflected in response to the guide surfaces engaging the mounting bracket such that the base part is insertable into the opening,
   wherein the L-shaped corner section of each leg is configured to, in a mounted state of the plastic clamp, engage the respective edge portion of the opening in response to extraction of the base part out of the opening such that the leg is pivoted about an axis defined by the L-shaped corner section under elastic deformation of the leg, and
   wherein the legs, when pivoted about the respective axis under elastic deformation, are configured to be brought to a state in which they abut each other such that further pivoting is restricted and thereby counteracting further extraction of the base part.

2. The system according to claim 1, wherein the elongated body of each leg has a reinforced transition section between the first portion and the second portion.

3. The system according to claim 1, wherein the base part has a base part width W1 in an unaffected state and wherein the opening has an opening width W2, wherein the base part width W1 in the unaffected state is greater than the opening width W2.

4. The system according to claim 1, wherein the base part has a base part width W3 in an affected state in which the legs are deflected towards each other in response to insertion of the base part of the plastic clamp into the opening and wherein the opening has an opening width W2, wherein the base part width W3 in the affected state corresponds to the opening width W2.

5. The system according to claim 1, further comprising an additional plastic clamp, wherein the mounting bracket is provided with an additional opening into which the base part of the additional plastic clamp is insertable with a snap fit for mounting of the additional plastic clamp to the mounting bracket.

6. The system according to claim 5, wherein the plastic clamp and the additional plastic clamp are oppositely arranged on the mounting bracket when mounted thereto.

7. The system according to claim 1, wherein the opening of the mounting bracket is provided in a peripheral portion thereof.

8. The system according to claim 1, further comprising an object attachable to the mounting bracket by snap fit engagement with the plastic clamp in its mounted state.

9. The system according to claim 8, wherein the object is a camera unit.

10. The system according to claim 1, wherein the mounting bracket is made of a metal material.

11. The system according to claim 1, wherein the connection part of the plastic clamp is provided with a tab protruding from the connection part in a longitudinal direction L of the plastic clamp.

* * * * *